United States Patent
Li et al.

(10) Patent No.: US 6,322,103 B1
(45) Date of Patent: Nov. 27, 2001

(54) ENERGY ABSORBER FOR MOTOR VEHICLE STEERING COLUMN

(75) Inventors: Xiaoyu Li; David Michael Byers, both of Saginaw, MI (US); Kevin Lawrence Roe, Lafayette, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/591,977

(22) Filed: Jun. 12, 2000

Related U.S. Application Data

(60) Provisional application No. 60/139,055, filed on Jun. 11, 1999.

(51) Int. Cl.[7] .................................................... B62D 1/19
(52) U.S. Cl. ............................................. 280/777; 74/492
(58) Field of Search ..................................... 280/775, 776, 280/777; 74/492, 493; 188/371, 374

(56) References Cited

U.S. PATENT DOCUMENTS

| | | | |
|---|---|---|---|
| 2,578,903 | * 4/1947 | Smith | 188/374 |
| 3,392,599 | 7/1968 | White . | |
| 4,117,741 | * 10/1978 | Yazane et al. | 74/492 |
| 4,630,716 | * 12/1986 | Faust | 188/371 |
| 4,886,295 | 12/1989 | Browne . | |
| 5,375,881 | * 12/1994 | Lewis | 280/777 |
| 5,487,562 | 1/1996 | Hedderly et al. . | |
| 5,562,307 | * 10/1996 | Conner | 280/777 |
| 5,605,352 | 2/1997 | Riefe et al. . | |
| 5,669,634 | * 9/1997 | Heinzman et al. | 280/777 |

FOREIGN PATENT DOCUMENTS

| | | |
|---|---|---|
| 9416120 | 12/1994 | (DE) . |
| 0769445 | 4/1997 | (EP) . |
| 03-136972 | 6/1991 | (JP) . |

* cited by examiner

*Primary Examiner*—Paul N. Dickson
*Assistant Examiner*—Faye M. Fleming
(74) *Attorney, Agent, or Firm*—Edmund P. Anderson

(57) ABSTRACT

An actively variable energy absorber including a convex anvil on a steering column housing, a flat metal strap attached to a steering column support and slidably engaging the convex anvil on an active surface area of the convex anvil, and a control apparatus for actively varying the geometric relationship between the flat metal strap and the convex anvil in response to changes in a control variable thereby to adjust the magnitude of the active surface area. Adjusting the magnitude of the active surface area changes the severity of plastic deformation of the flat metal strap and the magnitude of the friction between the flat metal strap and the convex anvil thereby to adjust the force resisting linear translation of the steering column housing. In some embodiments of the actively variable energy absorber, the flat metal strap is plastically deformed by being pulled over a single convex anvil during linear translation of the steering column housing. In other embodiments of the actively variable energy absorber, the flat metal strap is plastically deformed by being pulled across a plurality of convex anvils or by being pulled edgewise between a pair convex anvils.

6 Claims, 5 Drawing Sheets

ENERGY ABSORBER FOR MOTOR VEHICLE STEERING COLUMN

REFERENCE TO RELATED APPLICATIONS

This patent application claims priority of U.S. Provisional Patent Application No: 60/139,055, filed on Jun. 11, 1999.

TECHNICAL FIELD

This invention relates to an energy absorber for a motor vehicle steering column.

BACKGROUND OF THE INVENTION

A typical energy absorbing steering column on a motor vehicle includes a housing or mast jacket which translates linearly through a collapse stroke during a collision of the motor vehicle with another object when a steering hand wheel on the steering column is impacted by the operator of the motor vehicle. The mast jacket translates against a resisting force produced by an energy absorber which converts into work a fraction of the kinetic energy of the operator. Commonly, the resisting force is created by plastic deformation of a metal element of the energy absorber. For example, in the energy absorber described in U.S. Pat. No. 3,392,599, steel spheres plastically deform a metal mast jacket by rolling tracks in the mast jacket. In other prior energy absorbers, a flat metal strap is plastically deformed by being pulled over a stationary anvil or vice versa. Optimal performance of such energy absorbers is achieved when the kinetic energy of the operator is completely converted into work at the completion of the maximum collapse stroke of the mast jacket. However, because these energy absorbers are not adjustable after the steering column is assembled but operators of differing weight often operate the motor vehicle, optimal energy absorbing performance may not always occur. U.S. Pat. No. 4,886,295 describes an energy absorbing motor vehicle steering column having an energy absorber which is actively variable during operation of the motor vehicle for more optimal energy absorbing performance and which includes a plurality of roll deformers in an annulus between an inner tube and a longitudinally split outer tube. An expandable bag having fluid therein is disposed around the split outer. A control system which monitors control variables characteristic of the kinetic energy of an operator of the motor vehicle controls the fluid pressure in the bag and, therefore, the interference fit of the roll deformers between the inner and outer tubes, to optimize the performance of the energy absorber.

SUMMARY OF THE INVENTION

This invention is a new and improved actively variable energy absorber including a convex anvil on one of a steering column housing and a steering column support, a flat metal strap attached to the other of the steering column housing and the steering column support and slidably engaging the convex anvil on an active surface area of the convex anvil, and a control apparatus for actively varying the geometric relationship between the flat metal strap and the convex anvil in response to changes in a control variable thereby to adjust the magnitude of the active surface area. Adjusting the magnitude of the active surface area changes the severity of plastic deformation of the flat metal strap and the magnitude of the friction between the flat metal strap and the convex anvil thereby to adjust the force resisting linear translation of the steering column housing and the corresponding performance of the energy absorber. In some embodiments of the actively variable energy absorber according to this invention, the flat metal strap is plastically deformed by being pulled over a single convex anvil during linear translation of the steering column housing. In other embodiments of the energy absorber according to this invention, the flat metal strap is plastically deformed by being pulled across a plurality of convex anvils or by being pulled edgewise between a pair convex anvils.

DESCRIPTION OF THE PREFERRED EMBODIMENT

Figure 1:
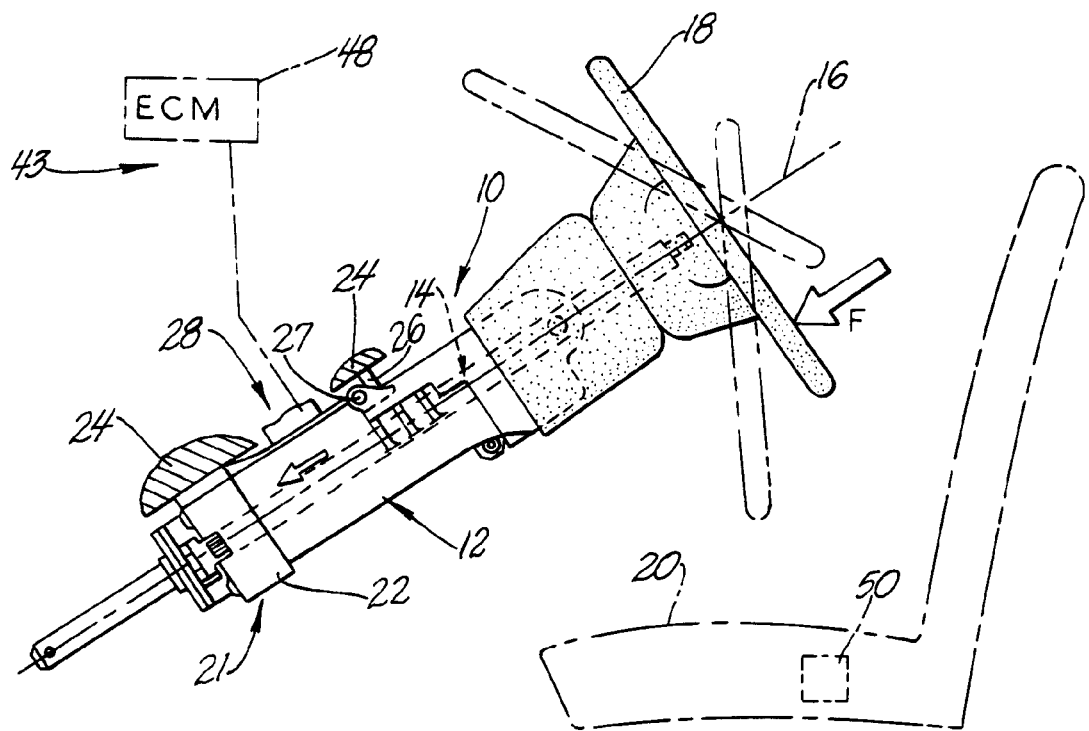
FIG. 1 is a schematic elevational view of a motor vehicle steering column having thereon an actively variable energy absorber according to this invention.

Referring to FIG. 1, a motor vehicle steering column 10 includes a housing 12, a steering shaft 14 supported on the housing for rotation about a longitudinal centerline 16 of the steering column, and a steering hand wheel 18 connected to an outboard end of the steering shaft and pivotable up and down for vertical adjustment relative to an operator, not shown, of the motor vehicle seated on a seat 20 behind the steering hand wheel in conventional fashion. A steering column support 21 includes a lower bracket 22 on a schematically represented body structure 24 of the motor vehicle and a plurality of vertical hanger bolts 26 which form a shelf on the vehicle body for a lateral rod 27 on the housing 12.

In a collision of the motor vehicle with another object, the vehicle body decelerates more rapidly than the operator so that the operator is thrust against the steering hand wheel 18 with an impact represented by a schematic vector force "F". When the operator impacts the steering hand wheel, the corresponding force on the steering column housing 12 initiates linear translation of the steering column housing 12 relative to the steering column support 21 in a collapse stroke in the direction of the centerline 16 of the steering column. An actively variable energy absorber 28 according to this invention, represented schematically in FIG. 1, between the steering column housing 12 and the steering column support 21 resists linear translation of the steering column housing to decelerate the occupant while at the same time converting into work a fraction of the occupant's kinetic energy.

Figure 2:
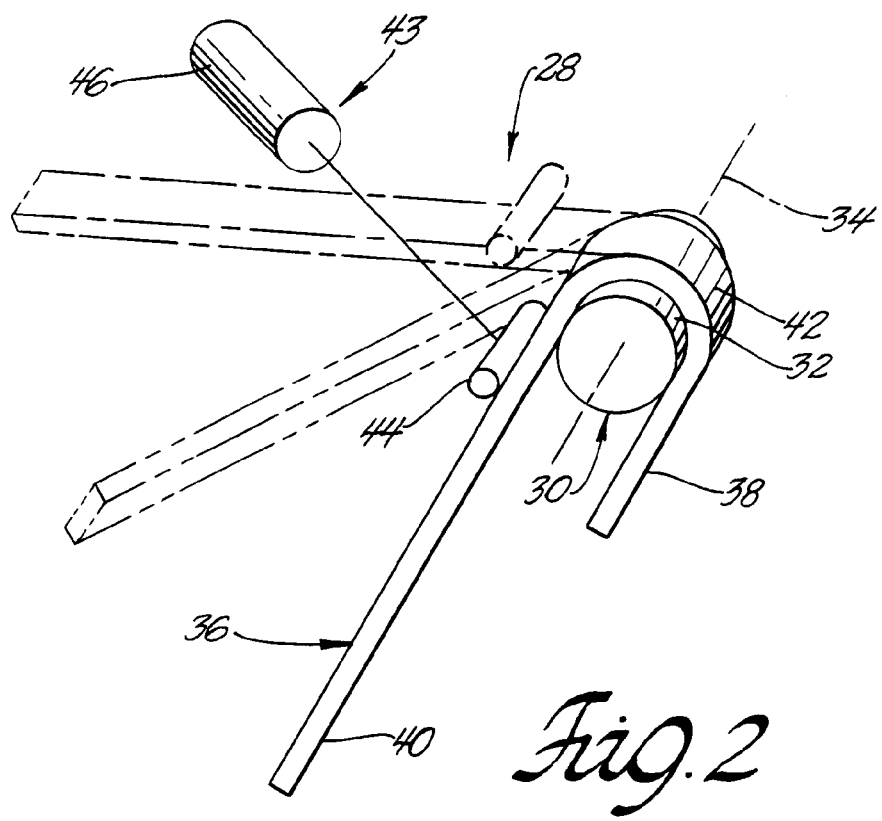
FIG. 2 is a fragmentary perspective view of the actively variable energy absorber according to this invention.

Referring to FIG. 2, the actively variable energy absorber 28 includes a reaction member 30 rigidly attached to the steering column housing 12 having a cylindrical surface thereon defining a convex anvil reaction surface 32 around a longitudinal centerline 34 of the reaction member perpendicular to the direction of the linear translation of the steering column housing during its collapse stroke. A J-shaped flat metal strap 36 of the energy absorber 28 has a first leg 38 on one side of the reaction member adapted for rigid attachment to the steering column support 21, an unattached or free second leg 40 on the other side of the reaction member, and a concave web 42 presenting a reaction surface of the strip between the first and the second legs facing convex anvil 32.

A force adjustment system or control apparatus 43 of the energy absorber 28 includes a restraint pin 44 supported on the steering column housing 12 parallel to the convex anvil 32 for translation in an arc about the centerline 34 toward and away from the second leg 40 of the flat metal strap. A schematically represented actuator 46 on the steering column housing translates the restraint pin toward and away from the second leg of the metal strap. The actuator 46 is controlled by a schematically represented electronic control module ("ECM") 48, FIG. 1. A transducer 50, FIG. 1, of the control apparatus 43 on the seat 20 provides an electronic signal to the ECM 48 corresponding to the magnitude of a control variable, e.g. the weight of the operator of the motor vehicle, characteristic of the kinetic energy of the operator. Other transducers, not shown, may provide electronic signals to the ECM 48 corresponding to the magnitudes of other control variables, e.g. vehicle velocity.

The force required to plastically deform the flat metal strap 36 by pulling it over the convex anvil 32 manifests itself as a force resisting linear translation of the steering column housing 12 in its collapse stroke. Friction between the flat metal strap 36 and the convex anvil 32 manifests itself as an additional force resisting linear translation of the steering column housing in its collapse stroke. The magnitudes of the resisting forces attributable to metal deformation and to friction depend upon a number of variables including the yield strength of the material from which the flat metal strap 36 is made and its physical dimensions, the coefficient of friction between the flat metal strap and the convex anvil 32, the radius of curvature of the convex anvil, and the area of mutual contact between the flat metal strap and the convex anvil referred to herein as the "active surface area" of the convex anvil. These variables are related according to the following equation:

$$F = A \cdot \frac{W \cdot t^2}{(1 - b \cdot \mu) \cdot R}$$

Where
F=total force resisting linear translation of the steering column housing
A=a material related constant, e.g. yield strength
W=width of the flat metal strap
t=thickness of the flat metal strap
R=radius of the convex anvil
b=parameter related to the active surface area of the convex anvil
$\mu$=contact friction coefficient In operation, at the onset of linear translation of the steering column housing 12 initiated by the impact F on the steering hand wheel 18, the concave web 42 of the metal strap is thrust against and the flat metal strap is pulled across the convex anvil 32 while the unrestrained second leg 40 fans outward until intercepted by the restraint pin 44 as illustrated in broken lines in FIG. 2. As the second leg fans outward, the active surface area of the convex anvil decreases. The position of the restraint pin 44 within its range of positions thus establishes the magnitude or size of the active surface area of the convex anvil. As the active surface area increases and decreases, the severity of plastic deformation of the flat metal strap across the convex anvil and the magnitude of the friction between the flat metal strap and the convex anvil likewise increase and decrease.

The position of the restraint pin 44 is established by the ECM 48 through the actuator 46 in accordance with the magnitude of the control or input variable, i.e. the weight of the operator on the seat 20, as communicated to the ECM by the transducer 50. As the control variable changes, e.g. as operators of successively greater weight occupy the seat 20, the actuator 46 progressively minimizes the separation between the restraint pin 44 and the second leg 40 of the metal strap and increases the active surface and thereby the mutual contact area by more completely wrapping the flat metal strap around the convex anvil during the collapse stroke of the steering column housing. The magnitude of the force resisting linear translation of the steering column housing in its collapse stroke, therefore, increases for more optimal energy absorbing performance. The same alternative terminology applies to the description of the subsequent embodiments.

Figure 3:
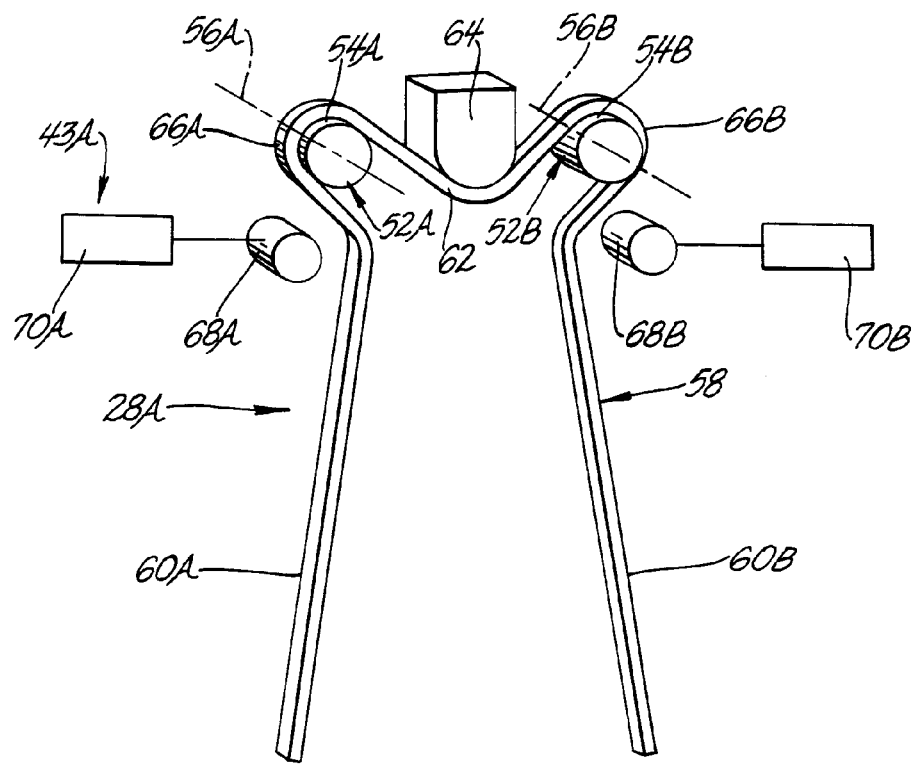
FIG. 3 is a fragmentary perspective view of a modified embodiment of the actively variable energy absorber according to this invention.

Referring to FIG. 3, a modified actively variable energy absorber 28A according to this invention includes a pair of reaction members 52A, 52B each rigidly attached to the steering column housing 12. The reaction members have cylindrical surfaces thereon defining respective ones of a pair of convex anvils 54A, 54B around corresponding ones of a pair of longitudinal centerlines 56A, 56B perpendicular to the direction of linear translation of the steering column housing during its collapse stroke. An M-shaped flat metal strap 58 has a pair of legs 60A, 60B outboard of the reaction members 52A, 52B, a lateral web 62 facing an abutment 64 on the steering column support 21, and a pair of concave webs 66A, 66B facing the convex anvils 54A, 54B.

A control apparatus 43A of the modified energy absorber 28A includes a pair of restraint pins 68A, 68B supported on the steering column housing 12 outboard of the legs 60A, 60B of the flat metal strap 58 for translation toward and away from the legs. A pair of schematically represented actuators 70A, 70B on the steering column housing translate the restraint pins toward and away from the legs. The actuators 70A, 70B are controlled by the ECM 48. The transducer 50 on the seat 20 provides an electronic signal to the ECM 48 corresponding to the magnitude of the aforesaid control variable characteristic of the kinetic energy of the operator.

In operation, at the onset of linear translation of the steering column housing 12 initiated by the impact F on the steering hand wheel 18, the abutment 64 thrusts the concave webs 66A, 66B of the flat metal strap 58 against and pulls the flat metal strap over the convex anvils 54A, 54B while the legs 60A, 60B of the metal strap fan outward until intercepted by the restraint pins 68A, 68B. As the legs 60A, 60B fan outward, the active surface area of the each of the convex anvils 54A, 54B decreases. The positions of the restraint pins 68A, 68B within their range of positions thus establishes the magnitude or size of the active surface area of each of the convex anvils. As the active surface areas increase and decrease, the severity of plastic deformation of the M-shaped flat metal strap across the convex anvils and the magnitude of the friction between the flat metal strap and the convex anvils likewise increase and decrease.

The positions of the restraint pins 68A, 68B are established by the ECM 48 through the actuators 70A, 70B in accordance with the magnitude of the aforesaid control variable as communicated to the ECM by the transducer 50. As the control variable changes, e.g. as operators of successively greater weight occupy the seat 20, the actuators 70A, 70B progressively minimize the separation between the restraint pins 68A, 68B and legs 60A, 60B of the flat metal strap thereby to increase the active surface areas of the convex anvils by more completely wrapping the flat metal strap around the convex anvils during the collapse stroke of the steering column housing. The magnitude of the force resisting linear translation of the steering column housing in its collapse stroke, therefore, increases for more optimal energy absorbing performance.

Figure 4:
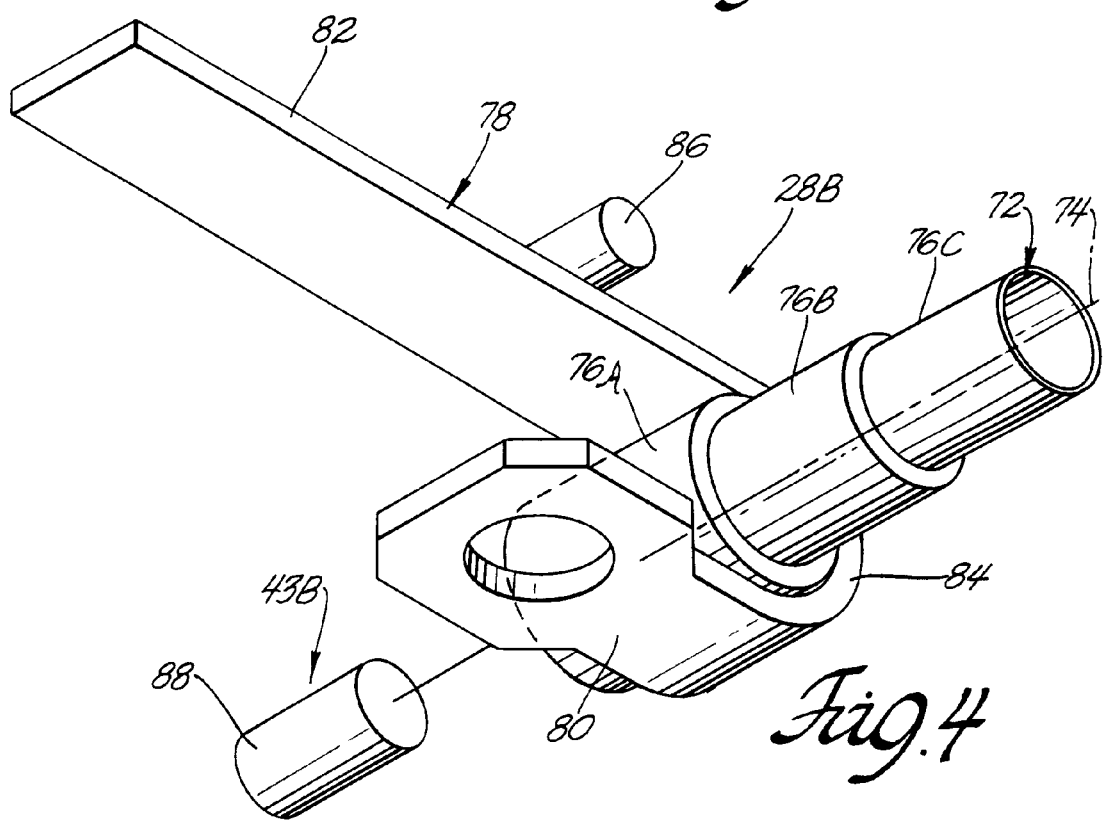
FIG. 4 is a fragmentary perspective view of a second modified embodiment of the actively variable energy absorber according to this invention.

Referring to FIG. 4, a second modified actively variable energy absorber 28B according to this invention includes a reaction member 72 supported on the steering column housing 12 for linear translation in the direction of a longitudinal centerline 74 of the reaction member perpendicular to the direction of the linear translation of the steering column housing during its collapse stroke. The reaction member 72 includes a plurality of cylindrical surfaces defining respective ones of a plurality of three convex anvils 76A, 76B, 76C having progressively smaller radii of curvature around the centerline 74. A J-shaped flat metal strap 78 has a first leg 80 adapted for rigid attachment to the steering column support 21 on one side of the reaction member, an unattached or free second leg 82 on the other side of the reaction member, and a concave web 84 between the first and the second legs. A restraint pin 86 is rigidly attached to the steering column housing 12 outboard of the second leg 82 of the flat metal strap.

A control apparatus 43B of the second modified energy absorber 28B includes a schematically represented actuator 88 on the steering column housing operable to linearly translate the reaction member 72 between a plurality of three positions in which respective ones of the three convex anvils 76A, 76B, 76C having greater or smaller radii of curvature face the concave web 84 of the flat metal strap 78. The actuator 88 is controlled by the ECM 48. The transducer 50 on the seat 20 provides an electronic signal to the ECM 48 corresponding to the magnitude of the aforesaid control variable characteristic of the kinetic energy of the operator.

In operation, at the onset of linear translation of the steering column housing 12 initiated by the impact F on the steering hand wheel 18, the concave web 84 of the flat metal strap is thrust against and the flat metal strap is pulled across the one of the three convex anvils 76A, 76B, 76C directly facing the concave web while the unrestrained second leg 82 fans outward until intercepted by the restraint pin 86. As the radius of curvature of the one of the convex anvils 76A, 76B, 76C facing the concave web 84 increases and decreases, i.e. as the reaction member translates back and forth in the direction of its centerline 74, the active surface area of the convex anvil increases and decreases. As the active surface area increases and decreases, the severity of plastic deformation of the flat metal strap across the convex anvil and the magnitude of the friction between the flat metal strap and the convex anvil likewise increase and decrease.

The position of the reaction member 72 is established by the ECM 48 through the actuator 88 in accordance with the magnitude of the aforesaid control variable as communicated to the ECM by the transducer 50. As the control variable changes, e.g. as operators of successively greater weight occupy the seat 20, the actuator 88 translates the reaction member 72 in a direction aligning with the concave web 84 respective ones of convex anvils 76A, 76B, 76C of increasing radii of curvature thereby to increase the active surface area of the convex anvil facing the concave web during the collapse stroke of the steering column housing. The magnitude of the force resisting linear translation of the steering column housing in its collapse stroke, therefore, increases for more optimal energy absorbing performance.

Figure 5:
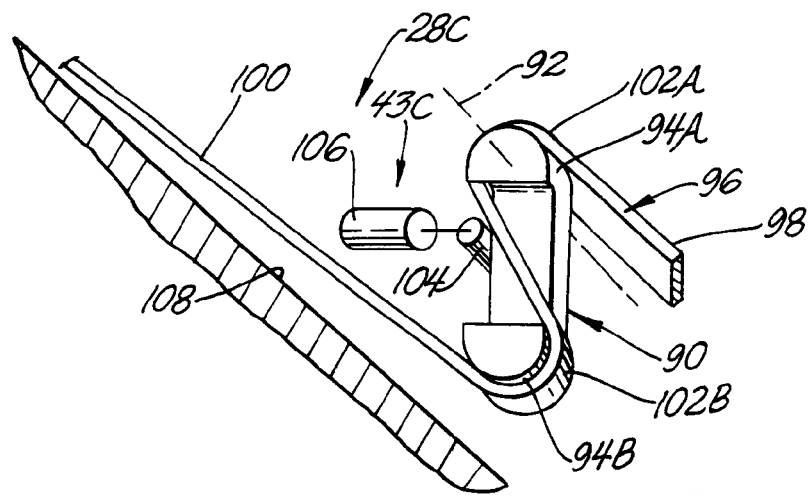
FIG. 5 is a fragmentary perspective view of a third modified embodiment of the actively variable energy absorber according to this invention.

Referring to FIG. 5, a third modified actively variable energy absorber 28C according to this invention includes a reaction member 90 supported on the steering column housing 12 for pivotal movement about an axis 92 perpendicular to the direction of linear translation of the steering column housing during its collapse stroke. The reaction member 90 has a pair of longitudinally separated convex anvils 94A, 94B thereon. An S-shaped flat metal strap 96 has a first leg 98 adapted for rigid attachment to the steering column support 21, an unattached or free second leg 100, and a pair of concave webs 102A, 102B between the first and the second legs facing respective ones of the convex anvils 94A, 94B.

A control apparatus 43C of the third modified energy absorber 28C includes a restraint pin 104 supported on the steering column housing 12 for linear translation in a plane perpendicular to the axis 92 toward and away from the reaction member 90. A schematically represented actuator 106 on the steering column housing translates the restraint pin 104 toward and away from the reaction member. The actuator 106 is controlled by the ECM 48. The transducer 50 on the seat 20 provides an electronic signal to the ECM 48 corresponding to the magnitude of the aforesaid control variable characteristic of the kinetic energy of the operator. The restraint pin 104 increasingly limits clockwise rotation of the reaction member 90 about the axis 92 as the actuator 106 translates the restraint pin toward the reaction member.

In operation, at the onset of linear translation of the steering column housing 12 initiated by the impact F on the steering hand wheel 18, the concave webs 102A, 102B of the flat metal strap 96 are thrust against and the flat metal strap is pulled across the convex anvils 94A, 94B while the reaction member 90 is induced to rotate clockwise about the axis 92 until intercepted by the restraint pin 104. As the reaction member rotates clockwise, the flat metal strap unwraps from the convex anvils and the active surface area of the each of the convex anvils 94A, 94B decreases. The second leg 100 of the flat metal strap is prevented from fanning outward by a wall 108 on the steering column housing 12. The position of the restraint pin 104 within its range of positions thus establishes the magnitude or size of the active surface area of each of the convex anvils. As the active surface areas increase and decrease, the severity of plastic deformation of the flat metal strap 96 across the convex anvils 94A, 94B and the magnitude of the friction between the flat metal strap and the convex anvils likewise increase and decrease.

The position of the restraint pin 104 is established by the ECM 48 through the actuator 106 in accordance with the magnitude of the aforesaid control variable as communicated to the ECM by the transducer 50. As the control variable changes, e.g. as operators of successively greater weight occupy the seat 20, the actuator 106 translates the restraint pin 104 toward the reaction member 90 thereby to increase the active surface areas of the convex anvils by more completely wrapping the flat metal strap around the convex anvils during the collapse stroke of the steering column housing. The magnitude of the force resisting linear translation of the steering column housing in its collapse stroke, therefore, increases for more optimal energy absorbing performance.

Figure 6:
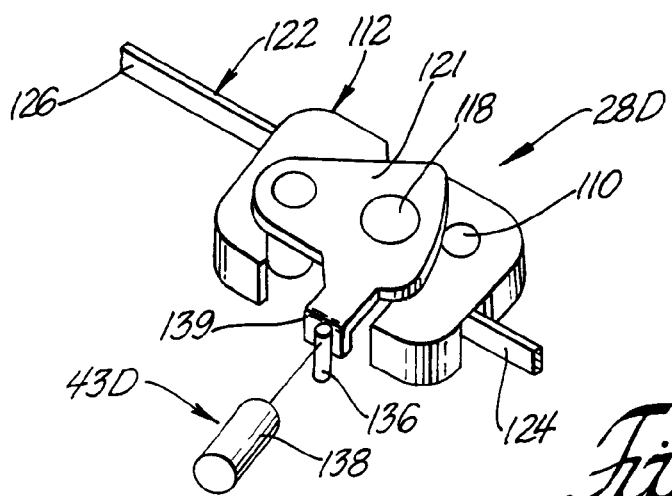
FIG. 6 is fragmentary perspective view of a fourth modified embodiment of the actively variable energy absorber according to this invention.
Figure 7:
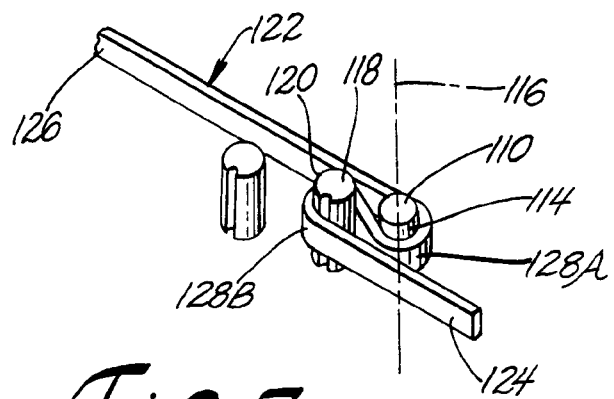
FIG. 7 is a fragmentary perspective view of a portion of the fourth modified embodiment of the actively variable energy absorber according to this invention.

Referring to FIGS. 6–7, a fourth modified actively variable energy absorber 28D according to this invention includes a first reaction member 110 rigidly supported in a box 112 fixed to the steering column housing 12. The first reaction member has a cylindrical surface thereon defining a first convex anvil 114 around a centerline 116 perpendicular to the direction of linear translation of the steering column housing during its collapse stroke. A second reaction member 118 having a cylindrical surface thereon defining a second convex anvil 120 is supported in the box 112 parallel to the first reaction member 110 by a pivotable cage 121 for linear translation in a plane perpendicular to the centerline 116 toward and away from the first reaction member. An S-shaped flat metal strap 122 has a first leg 124 adapted for rigid attachment to the steering column support 21, an unattached or free second leg 126, and a pair of concave webs 128A, 128B between the first and the second legs facing respective ones of the convex anvils 114,120.

A control apparatus 43D of the fourth modified energy absorber 28D includes a restraint pin 136 supported by a schematically represented actuator 138 on the steering column housing for linear translation toward and away from a tang 139 of the cage 121. The actuator 138 is controlled by the ECM 48. The transducer 50 on the seat 20 provides an electronic signal to the ECM 48 corresponding to the magnitude of the aforesaid control variable characteristic of the kinetic energy of the operator. The restraint pin 136 increasingly limits clockwise pivotal movement of the cage 121 as the actuator 138 translates the restraint pin toward the tang 139 on the cage.

In operation, at the onset of linear translation of the steering column housing 12 initiated by the impact F on the steering hand wheel 18, the concave webs 128A, 128D of the flat metal strap 122 are thrust against and the flat metal strap is pulled across the convex anvils 114,120 while the second reaction member 118 is concurrently pulled away from the first reaction member in a direction causing the cage 121 to pivot clockwise until intercepted by the restraint pin 136. As the cage pivots clockwise, the flat metal strap unwraps from the convex anvils and the active surface area of the each of the convex anvils 114,120 decreases. The second leg 126 of the flat metal strap is prevented from fanning outward by a side of the box 112. The position of the restraint pin 136 within its range of positions thus establishes the magnitude or size of the active surface area of each of the convex anvils. As the active surface areas increase and decrease, the severity of plastic deformation of the flat metal strap 122 across the convex anvils 114,120 and the magnitude of the friction between the flat metal strap and the convex anvils likewise increase and decrease.

The position of the restraint pin 136 is established by the ECM 48 through the actuator 138 in accordance with the magnitude of the aforesaid control variable as communicated to the ECM by the transducer 50. As the control variable changes, e.g. as operators of successively greater weight occupy the seat 20, the actuator 138 translates the restraint pin 136 toward the tang 139 on the cage 121 thereby to increase the active surface areas of the convex anvils by more completely wrapping the flat metal strap around the convex anvils during the collapse stroke of the steering column housing. The magnitude of the force resisting linear translation of the steering column housing in its collapse stroke, therefore, increases for more optimal energy absorbing performance.

Figure 8:
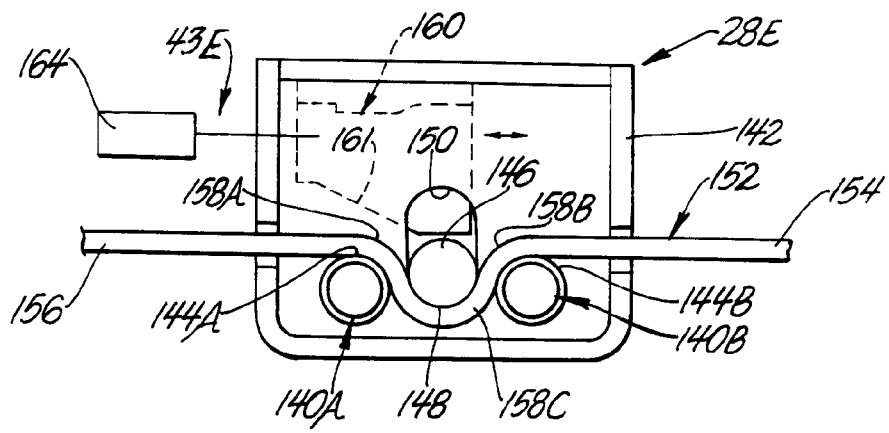
FIG. 8 is a schematic plan view of a fifth modified embodiment of the actively variable energy absorber according to this invention.

Referring to FIG. 8, a fifth modified actively variable energy absorber 28E according to this invention includes a pair of reaction members 140A, 140B rigidly supported in a box 142 on the steering column housing 12 perpendicular to the direction of linear translation of the steering column housing during its collapse stroke. The reaction members have cylindrical surfaces thereon defining respective ones of a pair of convex anvils 144A, 144B. A third reaction member 146 having a third convex anvil 148 thereon is supported on the box 142 between the reaction members 140A, 140B in a slot 150 in the box for linear translation toward and away from the reaction members 140A, 140B. A flat metal strap 152 traverses the box and has a first leg 154 adapted for rigid attachment to the steering column support 21, an unattached or free second leg 156, and a plurality of three concave webs 158A, 158B, 158C facing respective ones of the first, second and third convex anvils 144A, 144B, 148.

A control apparatus 43 E of the fifth modified energy absorber 28E includes a schematically represented wedge block 160 supported on the box 142 for linear translation perpendicular to the direction of linear translation of the third reaction member 146. The wedge block 160 has a ramp 161 thereon which intersects the slot 150 and blocks linear translation of the third reaction member away from the first and second reaction members 140A, 140B. A schematically represented actuator 164 on the steering column housing translates the wedge block 160 perpendicular to the direction of linear translation of the third reaction member 146. The actuator 164 is controlled by the ECM 48. The transducer 50 on the seat 20 provides an electronic signal to the ECM 48 corresponding to the magnitude of the aforesaid control variable characteristic of the kinetic energy of the operator. The wedge block 160 increasingly limits linear translation of the third reaction member 146 away from the first and second reaction members 140A, 140B as the actuator 164 translates the wedge block leftward and the ramp 161 further under the third reaction member.

In operation, at the onset of linear translation of the steering column housing 12 initiated by the impact F on the steering hand wheel 18, the third concave web 158C of the flat metal strap 152 is thrust against and the flat metal strap is pulled across the third convex anvil 148 causing the third reaction member 146 to translate linearly away from the first and second reaction members 140A, 140B until intercepted by the ramp 161 on the wedge block 160. At the same time, the first and second concave webs 158A, 158B are thrust against and the flat metal strap is pulled across the convex anvils 144A, 144B. As the third reaction member translates linearly away from the first and second reaction members, the flat metal strap unwraps from the convex anvils 144A, 144B, 148 and the active surface area of the each of the convex anvils decreases. The second leg 156 of the flat metal strap is prevented from fanning outward by a slot in the box 142. The position of the wedge block 160 within its range of positions thus establishes the magnitude or size of the active surface area of each of the convex anvils. As the active surface areas increase and decrease, the severity of plastic deformation of the flat metal strap 152 across the convex anvils 144A, 144B, 148 and the magnitude of the friction between the flat metal strap and the convex anvils likewise increase and decrease.

The position of the wedge block 160 is established by the ECM 48 through the actuator 164 in accordance with the magnitude of the aforesaid control variable as communicated to the ECM by the transducer 50. As the control variable changes, e.g. as operators of successively greater weight occupy the seat 20, the actuator 164 translates the wedge block leftward, FIG. 8, thereby to increase the active surface areas of the convex anvils 144A, 144B, 148 by more completely wrapping the flat metal strap around the convex anvils during the collapse stroke of the steering column housing. The magnitude of the force resisting linear translation of the steering column housing in its collapse stroke, therefore, increases for more optimal energy absorbing performance.

Figure 9:
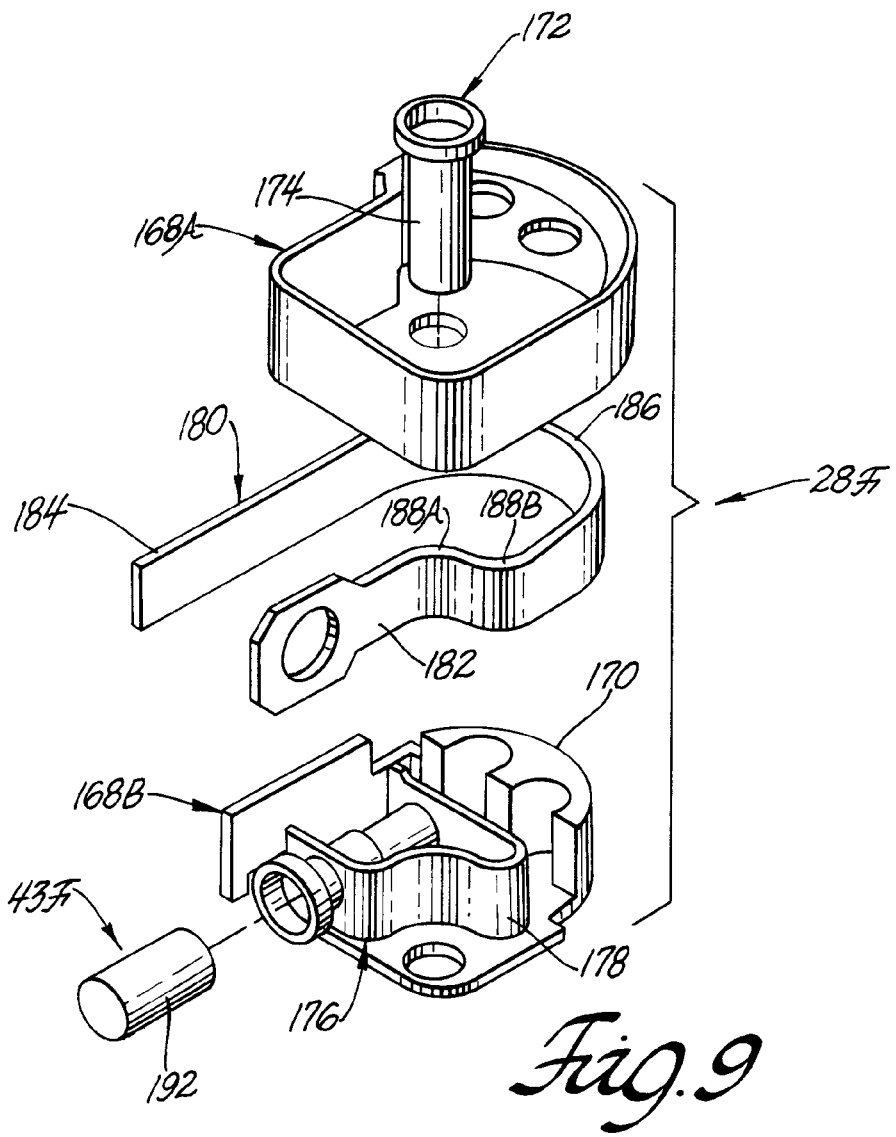
FIG. 9 is fragmentary, exploded perspective view of a sixth modified embodiment of the actively variable energy absorber according to this invention.

Referring to FIG. 9, a sixth modified actively variable energy absorber 28F according to this invention includes a 2-piece box 168A, 168B fixed to the steering column housing 12 having an arc-shaped guide surface 170 thereon. A first reaction member 172 is rigidly supported in the box perpendicular to the direction of linear translation of the steering column housing during its collapse stroke and includes a cylindrical surface defining a first convex anvil 174. A second reaction member 176 is supported in the box 168A, 168B for linear translation in a plane perpendicular to the first reaction member. An arched surface on the second reaction member 176 defines a second convex anvil 178 thereon parallel to the first convex anvil 174. A flat metal strap 180 has a first leg 182 adapted for rigid attachment to the steering column support 21, an unattached or free second leg 184, an arch 186 facing the guide surface 170 on the box, and a pair of concave webs 188A, 188B facing respective ones of the first and second convex anvils 174,178.

A control apparatus 43F of the sixth modified energy absorber 28F includes a schematically represented actuator 192 on the steering column housing operable to translate the second reaction member 176 back and forth to increase and decrease the separation between the first and the second convex anvils 174,178. The actuator 192 is controlled by the ECM 48. The transducer 50 on the seat 20 provides an electronic signal to the ECM 48 corresponding to the magnitude of the aforesaid control variable characteristic of the kinetic energy of the operator.

In operation, at the onset of linear translation of the steering column housing 12 initiated by the impact F on the steering hand wheel 18, the first and the second concave webs 188A, 188B are thrust against and the flat metal strap is pulled across the first and second convex anvils 174,178 while the second reaction member 176 is held stationary by the actuator 192. The second leg 184 of the flat metal strap is prevented from fanning outward by a side of the box 168A, 168B. When the actuator 192 translates the second reaction member 176 in a direction increasing the separation between the first and the second convex anvils 174,178, the flat metal strap unwraps from the convex anvils and the active surface area of the each of the convex anvils decreases. The position of the second reaction member 176 within its range of positions thus establishes the magnitude or size of the active surface area of each of the convex anvils. As the active surface areas increase and decrease, the severity of plastic deformation of the flat metal strap 180 across the convex anvils 174,178 and the magnitude of the friction between the flat metal strap and the convex anvils likewise increase and decrease.

The position of the second reaction member 176 is established by the ECM 48 through the actuator 192 in accordance with the magnitude of the aforesaid control variable as communicated to the ECM by the transducer 50.

As the control variable changes, e.g. as operators of successively greater weight occupy the seat 20, the actuator 192 translates the second reaction member 176 toward the first reaction member 172, thereby to increase the active surface areas of the convex anvils 174,178 by more completely wrapping the flat metal strap around the convex anvils during the collapse stroke of the steering column housing. The magnitude of the force resisting linear translation of the steering column housing in its collapse stroke, therefore, increases for more optimal energy absorbing performance.

Figure 10:
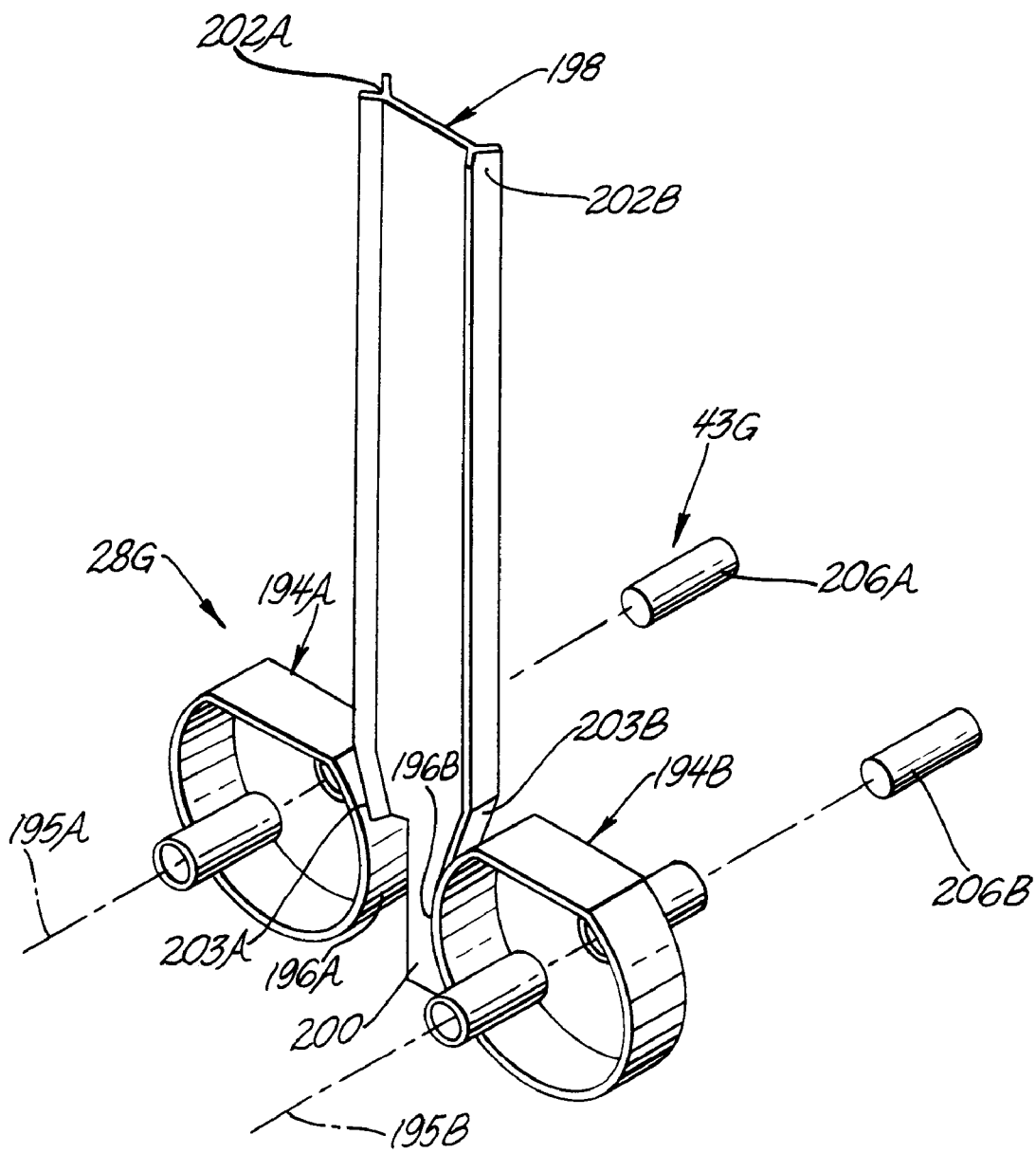
FIG. 10 is fragmentary perspective view of a seventh modified embodiment of the actively variable energy absorber according to this invention.

Referring to FIG. 10, a seventh modified actively variable energy absorber 28G according to this invention includes a pair of reaction members 194A, 194B supported on the steering column housing 12 for rotation about respective ones of a pair of parallel axes 195A, 195B perpendicular to the direction of linear translation of the steering column housing. Side edges of the reaction members define respective ones of a pair of convex anvils 196A, 196B each of which has a radius of curvature from a corresponding one of the rotation axes 195A, 195B which increases along the length of the convex anvil so that the convex anvils flare radially outward from the rotation axes. A flat metal strap 198 in a plane perpendicular to the rotation axes 195A, 195B includes a tongue 200 between the convex anvils 196A, 196B, a pair of split edges 202A, 202B, and a pair of concave shoulders 203A, 203B intersecting the split edges and facing respective ones of the convex anvils 196A, 196B. The concave shoulders correspond to the concave webs of the embodiments of the actively variable energy absorbers according to this invention described above. The tongue 200 is adapted for rigid attachment to the steering column support 21.

A control apparatus 43G of the seventh modified energy absorber 28G includes a pair of schematically represented actuators 206A, 206B on the steering column housing operable to rotate corresponding ones of the first and second reaction members 194A, 194B to progressively decrease the span between the convex anvils 196A, 196B. The actuators 206A, 206B are controlled by the ECM 48. The transducer 50 on the seat 20 provides an electronic signal to the BCM 48 corresponding to the magnitude of the aforesaid control variable characteristic of the kinetic energy of the operator.

In operation, at the onset of linear translation of the steering column housing 12 initiated by the impact F on the steering hand wheel 18, the first and the second concave shoulders 203A, 203B are thrust against and the flat metal strap is pulled between and across the first and second convex anvils 196A, 196B while the first and second reaction members 194A, 194B are held stationary by the actuators 206A, 206B. When the actuators 206A, 206B rotate the first and second reaction members in directions increasing the span between the first and second convex anvils, the active surface area of the each of the convex anvils decreases and vice versa. The angular positions of the first and second reaction members 194A, 194B within their range of angular positions thus establishes the magnitude or size of the active surface area of each of the convex anvils. As the active surface areas increase and decrease, the severity of plastic deformation of the flat metal strap 198 across the convex anvils 196A, 196B and the magnitude of the friction between the flat metal strap and the convex anvils likewise increase and decrease.

The angular position of each of the first and second reaction members 194A, 194B is established by the ECM 48 through the actuators 206A, 206B in accordance with the magnitude of the aforesaid control variable as communicated to the ECM by the transducer 50. As the control variable changes, e.g. as operators of successively greater weight occupy the seat 20, the actuators 206A, 206D to rotate the first and second reaction members 194A, 194B in directions decreasing the span between the convex anvils 196A, 196B, thereby to increase the active surface areas of the convex anvils during the collapse stroke of the steering column housing. The magnitude of the force resisting linear translation of the steering column housing in its collapse stroke, therefore, increases for more optimal energy absorbing performance.

In each of the embodiments of the actively variable energy absorber according to this invention described herein, the flat metal strap is described as being attached to the steering column support and the convex anvils and the control apparatuses are described as being supported on the steering column housing. It is, of course, within the scope of this invention to reverse the positions of the flat metal strap, the reaction members, and the control apparatuses relative to the steering column housing and the steering column support.

Having thus described the invention, what is claimed is:

1. An actively variable energy absorber comprising:
    a flat metal strap,
    a convex anvil,
    an attachment means operable to attach the flat metal strap to a first one of a housing of a steering column and a steering column support and the convex anvil to a second one of the steering column housing and the steering column support so that during a collapse stroke of the steering column housing relative to the steering column support the flat metal strap is thrust against and pulled across an active surface area of the convex anvil and the collapse stroke of the steering column housing is opposed by a resisting force attributable to plastic deformation of the flat metal strap at the active surface area of the convex anvil and to friction between the flat metal strap and the active surface area of the convex anvil, and
    a control means operable in response to changes in a predetermined control variable to vary the active surface area of the convex anvil thereby to vary the magnitude of the resisting force by changing the severity of plastic deformation of the flat metal strap and the friction between the flat metal strap and the convex anvil.

2. An actively variable energy absorber comprising:
    a first reaction member supported on a first one of a steering column housing and a steering column support,
    a first convex anvil on the first reaction member,
    a second reaction member supported on the first one of the steering column housing and the steering column support for linear translation toward and away from the first reaction member,
    a second convex anvil on the second reaction member,
    an arch-shaped guide surface on the first one of the steering column housing and the steering column support,
    a flat metal strap bearing against the arch-shaped guide surface and extending between the first and the second convex anvils having first concave web facing the first convex anvil and a second concave web facing the second convex anvil,
    an attachment means operable to attach a second one of the steering column housing and the steering column support to an end of the flat metal strap so that during a collapse stroke of the steering column housing relative to the steering column support the flat metal strap is thrust against and pulled across an active surface area of each of the first and the second convex anvils and the collapse stroke of the steering column housing is opposed by a resisting force attributable to plastic deformation of the flat metal strap at the active surface area of each of the first and the second convex anvils and to friction between the flat metal strap and the active surface area of each of the first and the second convex anvils, and
    a control means operable in response to changes in a predetermined control variable to vary the active surface area of each of the first and the second convex anvils thereby to vary the magnitude of the resisting force by changing the severity of plastic deformation of the flat metal strap and the friction between the flat metal strap and each of the first and the second convex anvils.

3. The actively variable energy absorber recited in claim 2 wherein the control means comprises:
    an actuator means operable to vary the magnitude of the active surface area of each of the first and the second convex anvils in contact with corresponding ones of the first and the second concave webs of the flat metal strap during the collapse stroke of the steering column housing by linearly translating the second reaction member toward and away from the first reaction member in response to changes in the predetermined control variable.

4. An energy absorbing device comprising:
    at least one anvil having a reaction surface;
    a strip of plastically deformable metal having a concave reaction surface engaging said reaction surface of said at least one anvil to define a mutual contact area between said strip and said at least one anvil, said strip and said at least one anvil being supported for relative movement in a direction to cause said strip to be forcibly drawn across said reaction surface of said at least one anvil in response to application of a reaction force during which movement said strip is caused to plastically deform and thereby impart a resisting force which counteracts said applied force; and
    wherein said strip and said at least one anvil are supported for further relative movement in such manner as to change said mutual contact area between said strip and said at least one anvil and thereby change said associated resisting force in response to an input variable.

5. An energy absorbing device comprising:
    a plastically deformable metal strip;
    at least one anvil having a reaction surface;
    said strip having a reaction surface engaging said reaction surface of said at least one anvil across a mutual contact area and being relatively slideable across said reaction surface of said at least one anvil in response to application of a reaction force during which said strip is caused to plastically deform to impart a counteracting resistance force; and
    means for changing the mutual contact area in response to an input variable to change the resistance force.

6. A steering column assembly comprising:
    a column housing supporting a steering shaft for rotation about a longitudinal axis;
    a steering column support;

an actively variable energy absorbing device disposed between said column housing and said column support including at least one anvil having a reaction surface and a plastically deformable metal strip having a reaction surface engaging said reaction surface of said at least one anvil across a mutual contact area, said strip being anchored at a location spaced from said at least one anvil and having a free end, said strip being supported for relative movement in a direction to cause said strip to be forcibly drawn across said reaction surface of said at least one anvil in response to a collapsing force applied to said column housing sufficient to cause said column housing to be displaced along said axis, said relative movement of said strip across said at least one anvil being operative to cause said strip to plastically deform and thereby impart a resisting force which counteracts said applied force; and including a force adjustment system operative in response to receiving an input variable for changing the mutual contact area between said strip and said at least one anvil so as to increase or decrease the corresponding resisting force offered by said energy absorbing device to counteract said applied collapsing force.

\* \* \* \* \*